(12) United States Patent
Zhang

(10) Patent No.: US 11,893,776 B2
(45) Date of Patent: Feb. 6, 2024

(54) IMAGE RECOGNITION METHOD AND APPARATUS, TRAINING METHOD, ELECTRONIC DEVICE, AND STORAGE MEDIUM

(71) Applicant: BOE TECHNOLOGY GROUP CO., LTD., Beijing (CN)

(72) Inventor: Zhenzhong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 215 days.

(21) Appl. No.: 17/593,010

(22) PCT Filed: Oct. 30, 2020

(86) PCT No.: PCT/CN2020/125269
§ 371 (c)(1),
(2) Date: Sep. 3, 2021

(87) PCT Pub. No.: WO2022/088043
PCT Pub. Date: May 5, 2022

(65) Prior Publication Data
US 2022/0375207 A1    Nov. 24, 2022

(51) Int. Cl.
*G06V 10/00* (2022.01)
*G06V 10/80* (2022.01)
(Continued)

(52) U.S. Cl.
CPC .......... *G06V 10/806* (2022.01); *G06V 10/778* (2022.01); *G06V 10/82* (2022.01); *G06V 30/248* (2022.01)

(58) Field of Classification Search
CPC .... G06V 10/806; G06V 10/778; G06V 10/82; G06V 10/248; G06V 10/40; G06V 10/42;
(Continued)

(56) References Cited

U.S. PATENT DOCUMENTS

| | | | | |
|---|---|---|---|---|
| 4,891,762 A | * | 1/1990 | Chotiros | G06V 10/7515 342/64 |
| 5,933,525 A | * | 8/1999 | Makhoul | G06V 30/2276 382/192 |

(Continued)

FOREIGN PATENT DOCUMENTS

| | | |
|---|---|---|
| CN | 109993165 A | 7/2019 |
| CN | 110147791 A | 8/2019 |

(Continued)

OTHER PUBLICATIONS

Yang Cao; "Text Detection and Recognition for Curved Targets", Full-text Database of China Excellent Master's Thesis Medical and Health Technology Series (Jul. 15, 2020) Issue 7; ISSN: 1673-0246, 78 pages.

(Continued)

*Primary Examiner* — Amir Alavi

(57) ABSTRACT

An image recognition method and apparatus, a training method, an electronic device, and a storage medium are provided. The image recognition method includes: acquiring an image to be recognized, the image to be recognized including a target text; and determining text content of the target text based on knowledge information and image information of the image to be recognized.

20 Claims, 8 Drawing Sheets

(51) Int. Cl.
*G06V 10/778* (2022.01)
*G06V 10/82* (2022.01)
*G06V 30/24* (2022.01)

(58) Field of Classification Search
CPC .. G06V 10/421; G06V 10/422; G06V 10/424; G06V 10/426; G06V 10/443; G06V 10/431; G06V 10/435; G06V 10/44; G06V 30/19173; G06V 30/26; G06V 30/248; G06N 3/08; G06N 3/045; G06N 3/454; G06N 3/02
See application file for complete search history.

(56) References Cited

U.S. PATENT DOCUMENTS

| | | | |
|---|---|---|---|
| 6,636,619 B1* | 10/2003 | Zhang | G06V 40/16 382/164 |
| 9,082,175 B2* | 7/2015 | Lau | G06T 1/005 |
| 9,747,258 B2* | 8/2017 | Ben-Aharon | G06F 40/106 |
| 9,996,566 B2* | 6/2018 | Ben-Aharon | G06F 16/2246 |
| 10,257,299 B2* | 4/2019 | Sadanandan | H04L 67/55 |
| 10,521,691 B2* | 12/2019 | Najibikohnehshahri | G06T 7/11 |
| 10,783,325 B1* | 9/2020 | Hecht | G06F 40/174 |
| 10,860,898 B2* | 12/2020 | Yang | G06N 3/084 |
| 11,222,286 B2* | 1/2022 | Choe | G06Q 10/10 |
| 2019/0311210 A1* | 10/2019 | Chatterjee | G06N 3/045 |

FOREIGN PATENT DOCUMENTS

| | | |
|---|---|---|
| CN | 110599512 A | 12/2019 |
| CN | 111523316 A | 8/2020 |
| CN | 111723789 A | 9/2020 |

OTHER PUBLICATIONS

Xiaobing Chen; "Research on Visual Question Answering Technology Based on Knowledge Base", Full-text Database of China Excellent Master's Thesis Information Technology Series, Issue 7, 2020; pp. 1138-1891.

Zhi Tian, et al; "Detecting Text in Natural Image with Connectionist Text Proposal Network", Springer International Publishing AG 2016, pp. 56-72.

Baoguang Shi, et al; "An End-to-End Trainable Neural Network for Image-based Sequence Recognition and Its Application to Scene Text Recognition", arXiv:1507.05717v1 [cs.CV] Jul. 21, 2015, 9 pages.

* cited by examiner

IMAGE RECOGNITION METHOD AND APPARATUS, TRAINING METHOD, ELECTRONIC DEVICE, AND STORAGE MEDIUM

TECHNICAL FIELD

Embodiments of the present disclosure relate to an image recognition method and apparatus, a training method, an electronic device, and a storage medium.

BACKGROUND

Optical character recognition (OCR) is a widely used character recognition technology. OCR refers to a process that electronic devices (such as scanners or digital cameras) check characters printed on a paper, determine the shapes of the characters by detecting dark and bright patterns, and then translate the shapes into computer characters by using character recognition methods. For example, the optical character recognition technology can, for printed characters, convert the characters in paper documents into black-and-white dot matrix image files by using an optical method, and convert the characters in the images into text format through recognition technology for further editing and processing by the word processing software. In short, the OCR technology can recognize characters in the images and return the characters in the images in the form of text.

SUMMARY

At least one embodiment of the present disclosure provides an image recognition method, which comprises: acquiring an image to be recognized, the image to be recognized comprising a target text; and determining text content of the target text based on knowledge information and image information of the image to be recognized.

For example, in the image recognition method provided by an embodiment of the present disclosure, determining the text content of the target text based on the knowledge information and the image information of the image to be recognized comprises: performing feature extraction on the image to be recognized so as to obtain a target feature; obtaining knowledge representation data based on the knowledge information; fusing the target feature and the knowledge representation data to obtain a fusion result; and determining the text content of the target text based on the fusion result.

For example, in the image recognition method provided by an embodiment of the present disclosure, fusing the target feature and the knowledge representation data to obtain the fusion result comprises: obtaining a state feature based on the target feature through a recurrent neural network; and concatenating the state feature and the knowledge representation data to obtain the fusion result.

For example, in the image recognition method provided by an embodiment of the present disclosure, concatenating the state feature and the knowledge representation data to obtain the fusion result comprises: based on the state feature and the knowledge representation data, obtaining a concatenating feature of each moment in a plurality of moments. The concatenating feature is the fusion result.

For example, in the image recognition method provided by an embodiment of the present disclosure, obtaining the state feature based on the target feature through the recurrent neural network comprises: determining one moment among the plurality of moments as a current moment by using a bi-directional recurrent neural network; and obtaining a hidden state of the current moment based on the target feature. The hidden state of the current moment comprises a forward hidden state of the current moment and a backward hidden state of the current moment, and a hidden state of each moment in the plurality of moments is the state feature.

For example, in the image recognition method provided by an embodiment of the present disclosure, obtaining the concatenating feature of each moment in the plurality of moments based on the state feature and the knowledge representation data comprises: determining a fusion feature of the current moment based on the hidden state of the current moment and the knowledge representation data; and concatenating the hidden state of the current moment and the fusion feature of the current moment to obtain the concatenating feature of the current moment.

For example, in the image recognition method provided by an embodiment of the present disclosure, determining the fusion feature of the current moment based on the hidden state of the current moment and the knowledge representation data comprises: based on the hidden state of the current moment, determining M pieces of knowledge representation data, which have matching relevance with the hidden state of the current moment, from a plurality of pieces of knowledge representation data comprised in the knowledge representation data; and determining the fusion feature of the current moment based on the M pieces of knowledge representation data and the hidden state of the current moment. M is an integer greater than 0.

For example, in the image recognition method provided by an embodiment of the present disclosure, based on the hidden state of the current moment, determining the M pieces of knowledge representation data, which have matching relevance with the hidden state of the current moment, from the plurality of pieces of knowledge representation data, comprises: calculating a similarity parameter between each piece of knowledge representation data in the plurality of pieces of knowledge representation data and the hidden state of the current moment; and determining the M pieces of knowledge representation data based on the similarity parameter.

For example, in the image recognition method provided by an embodiment of the present disclosure, an expression of the similarity parameter is as follows: $\text{sim}(j)=(\overrightarrow{Ht}, \overleftarrow{Ht})^T \times W \times ej$, where $ej$ represents jth piece of knowledge representation data in the plurality of pieces of knowledge representation data, t represents the current moment, superscript T represents transposition, $\overrightarrow{Ht}$ represents the forward hidden state of the current moment, $\overleftarrow{Ht}$ represents the backward hidden state of the current moment, W represents a parameter matrix, $\text{sim}(j)$ represents a similarity parameter between the jth piece of knowledge representation data and the hidden state of the current moment, t is an integer greater than 0, and j is an integer greater than 0.

For example, in the image recognition method provided by an embodiment of the present disclosure, determining the M pieces of knowledge representation data based on the similarity parameter comprises: taking the M pieces of knowledge representation data with largest similarity parameters as the M pieces of knowledge representation data having matching relevance with the hidden state of the current moment, or taking knowledge representation data with similarity parameters greater than a preset threshold as the M pieces of knowledge representation data having matching relevance with the hidden state of the current moment.

For example, in the image recognition method provided by an embodiment of the present disclosure, an expression of the fusion feature of the current moment is as follows:

$$Et = \frac{\sum_{j=1}^{M} e^{sim(j)} \times ej}{\sum_{k=1}^{M} e^{sim(k)}},$$

where t represents the current moment, Et represents the fusion feature of the current moment, ej represents jth piece of knowledge representation data in the M pieces of knowledge representation data, sim(j) represents a similarity parameter between the jth piece of knowledge representation data in the M pieces of knowledge representation data and the hidden state of the current moment, and sim(k) represents a similarity parameter between kth piece of knowledge representation data in the M pieces of knowledge representation data and the hidden state of the current moment, and t, j, k are integers greater than 0.

For example, in the image recognition method provided by an embodiment of the present disclosure, determining the text content of the target text based on the fusion result comprises: outputting a prediction result corresponding to each moment in the plurality of moments based on the concatenating feature; and determining the text content of the target text based on the prediction result.

For example, in the image recognition method provided by an embodiment of the present disclosure, performing the feature extraction on the image to be recognized so as to obtain the target feature comprises: performing the feature extraction on the image to be recognized so as to obtain the target feature by using a convolution neural network.

For example, the image recognition method provided by an embodiment of the present disclosure further comprises: performing text region detection on the image to be recognized so as to obtain a text region image comprising the target text.

For example, in the image recognition method provided by an embodiment of the present disclosure, determining the text content of the target text based on the knowledge information and the image information of the image to be recognized comprises: determining the text content of the target text based on the knowledge information and image information of the text region image.

For example, the image recognition method provided by an embodiment of the present disclosure further comprises: outputting the text content of the target text.

For example, in the image recognition method provided by an embodiment of the present disclosure, the image to be recognized comprises a medicine image to be recognized.

For example, in the image recognition method provided by an embodiment of the present disclosure, the knowledge information comes from a data knowledge base, and the data knowledge base comprises a medicine knowledge base.

At least one embodiment of the present disclosure further provides a training method of a first neural network for image recognition. The first neural network comprises a recurrent neural network and a convolution neural network. The first neural network is configured to: acquire an image to be recognized, the image to be recognized comprising a target text; and determine text content of the target text based on knowledge information and image information of the image to be recognized. The training method comprises: inputting training data into the first neural network to obtain output data output from the first neural network; and by using a back propagation algorithm, based on a loss function, modifying parameters of the recurrent neural network and parameters of the convolution neural network.

At least one embodiment of the present disclosure further provides an image recognition apparatus, which comprises: an acquisition module, configured to acquire an image to be recognized, the image to be recognized comprising a target text; and a determination module, configured to determine text content of the target text based on knowledge information and image information of the image to be recognized.

At least one embodiment of the present disclosure further provides an electronic device, which comprises: a processor; and a memory, comprising one or more computer program modules. The one or more computer program modules are stored in the memory and configured to be executed by the processor, and the one or more computer program modules is configured to realize the image recognition method according to any one of the embodiments of the present disclosure.

At least one embodiment of the present disclosure further provides a non-transitory readable storage medium, for storing computer readable instructions. In the case where the computer readable instructions are executed by a computer, the image recognition method according to any one of the embodiments of the present disclosure is realized.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
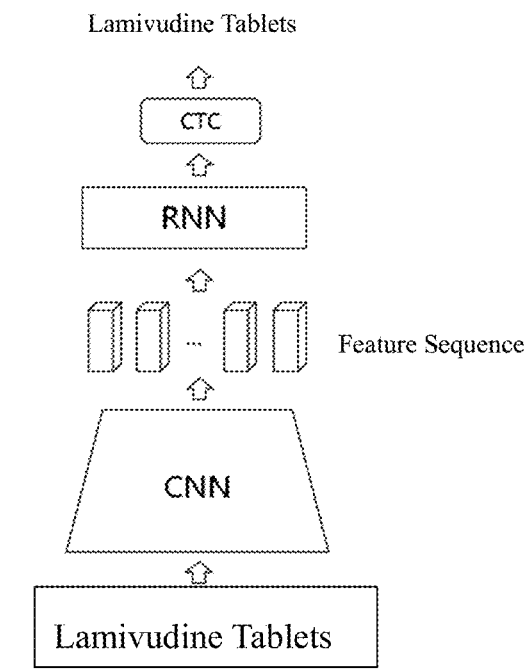
FIG. 1 is a structural schematic diagram of a convolution recurrent neural network provided by at least one embodiment of the present disclosure.

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

OCR technology can be applied to various scenes to provide text detection and recognition services. For example, the recognition services include the recognition of common cards and certificates, such as identification (ID) cards and bank cards, the recognition of financial bills and medical bills, etc. For example, upon visiting a doctor in a medical institution, a lot of paper documents are usually produced, such as test sheets and charge sheets. For example, upon making insurance claims or transferring to another hospital, it is usually necessary to convert the paper documents into electronic versions, and the contents of the paper documents can be converted into electronic files by the OCR technology. Compared with manual entry, the OCR technology can save time and improve work efficiency.

For example, in an example, the medicine name can be recognized from a medicine box image taken by the user, which is convenient for the user to input and query the medicine information. For example, in an example scenario, an elderly user took three medicines from a hospital, and there is a medicine query system that can be used to query the usage and dosage of the medicines and the incompatibility between the medicines. In this case, the elderly user needs to enter the names of the three medicines for querying. However, it is relatively difficult for elderly users to input the medicine names, but it is relatively easy to take images with mobile phones. Therefore, the medicine names can be recognized by using an image recognition method, and the medicine names recognized from the images can be used as input, which is convenient for the elderly users to use.

For example, in an example, a neural network model can be adopted to realize text recognition based on the image. For example, in an example, a convolution recurrent neural network illustrated in FIG. 1 is used for the text recognition. For example, the convolution recurrent neural network is a combination of a convolution neural network (CNN) and a recurrent neural network (RNN), which is used to identify sequential objects in the image. Although the convolution recurrent neural network can be composed of different types of network architectures (such as CNN and RNN), the convolution recurrent neural network can be jointly trained by using one loss function. For example, the network structure of the convolution recurrent neural network can be composed of three parts, including a convolution layer, a recurrent layer and a transcription layer from bottom to top. For example, any type of convolution neural network (CNN) can be used in the convolution layer at the bottom of the convolution recurrent neural network, such as the CNN in the bottom of FIG. 1, for extracting features from the input image so as to obtain a convolution feature map. For example, in an example, the size of an input image is (32, 100, 3), which is converted into a convolution feature matrix (convolution feature map) with a size of (1, 25, 512) after passing through the CNN. Here, the size is expressed in the form of (height, width, channel). In order to input the features into the recurrent layer, it is necessary to extract a feature vector sequence from the feature map output by the CNN, and each feature vector is generated from left to right in columns on the feature map. For example, in the above example, each feature vector extracted from the convolution feature matrix with a size of (1, 25, 512) contains 512-dimensional features, and these feature vectors constitute a feature sequence. The feature sequence can be used as the input of the recurrent layer, and each feature vector can be used as the input of the RNN at a time step (also called moment in the present disclosure). In the example of the convolution feature matrix of size (1, 25, 512) described above, there are 25 moments (the time steps). For example, the recurrent layer of the convolution recurrent neural network can adopt any type of recurrent neural network (RNN), such as bi-directional recurrent neural network (BiRNN), bi-directional long short term memory (BiLSTM) network, etc. The RNN illustrated in FIG. 1 is used to predict the feature sequence, learn from each feature vector in the feature sequence, and then output the prediction result (e.g., the probability distribution of tags). For example, there is one input feature vector in one time step, and the probability distribution of all tags is output for each input feature vector. For example, a tag category output by each column can be obtained through an argmax function (for example, this function is used to select the tag with the highest probability value), thus forming a preliminary tag sequence. For example, the tag can be a character or a word, which can be set according to actual needs. For example, in an example, the preliminary tag sequence output by the RNN is "-Laramie-Miffdin-Tablets", where "-" indicates that there is on output at the corresponding moment. For example, the transcription layer at the top of the convolution recurrent neural network is used to transform the predicted result tags output by the recurrent layer into the final tag sequence, thus realizing text recognition based on the image. For example, the transcription layer can use algorithms, such as connectionist temporal classification (CTC) to find the tag sequence with the highest probability combination according to the prediction result. For example, the preliminary tag sequence "-Laramie-Mivudine-Tablets" is converted into "Lamivudine Tablets". For example, as illustrated in FIG. 1, the text content in the input image can be recognized as "Lamivudine Tablets" based on the input image at the bottom of the figure.

It should be noted that the embodiments of the present disclosure do not limit the specific network structure of the above-mentioned convolution recurrent neural network which can be referred to other relevant documents or be adjusted according to the actual situation.

In order to improve the accuracy of the text recognition, at least one embodiment of the disclosure provides an image recognition method, which comprises the following steps: acquiring an image to be recognized, in which the image to be recognized comprises a target text; and determining text content of the target text based on knowledge information and image information of the image to be recognized. At least one embodiment of the present disclosure also provides an image recognition apparatus, an electronic device and a non-transitory readable storage medium corresponding to the above image recognition method.

According to the image recognition method provided by at least one embodiment of the present disclosure, upon performing the text recognition operation, not only the image information of the image to be recognized, but also the knowledge information from the associated data knowledge base are considered, and the accuracy of the text recognition can be improved by integrating these two aspects of information for the text recognition.

The image recognition method provided by at least one embodiment of the present disclosure will be explained in a non-limiting manner by several examples or embodiments with reference to the accompanying drawings. As described below, different features in these specific examples or embodiments can be combined with each other without conflicting with each other, so as to obtain new examples or embodiments, which also belong to the protection scope of the present disclosure.

Figure 2A:
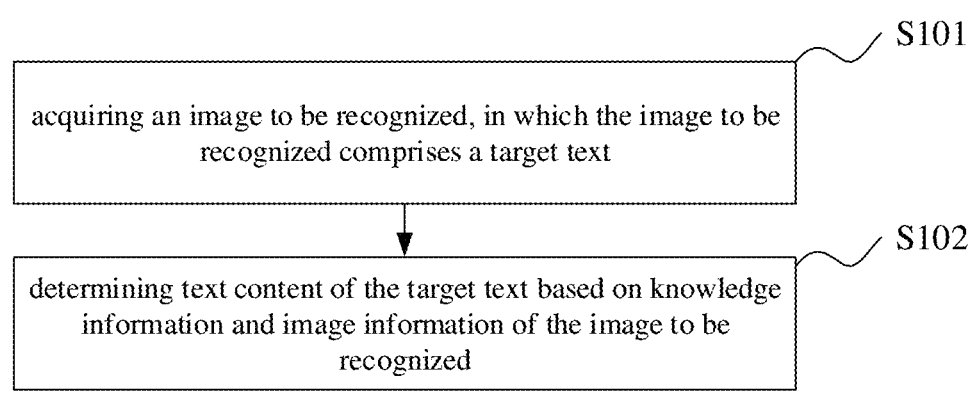
FIG. 2A is a flowchart of an image recognition method provided by at least one embodiment of the present disclosure.
Figure 2B:
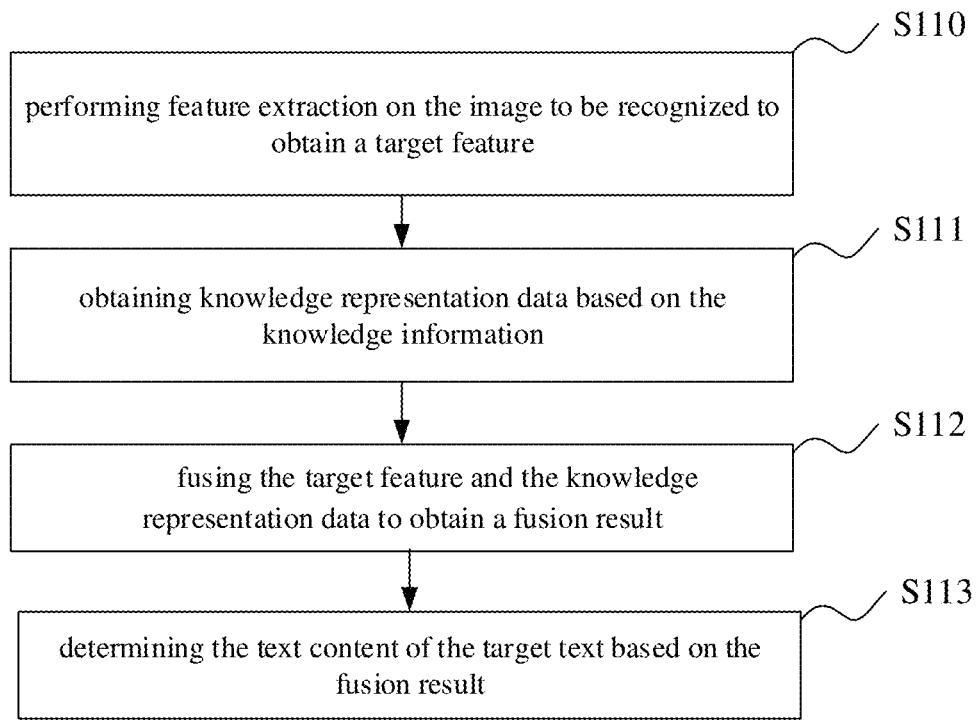
FIG. 2B is a schematic diagram corresponding to step S102 in an image recognition method provided by at least one embodiment of the present disclosure.
Figure 2C:
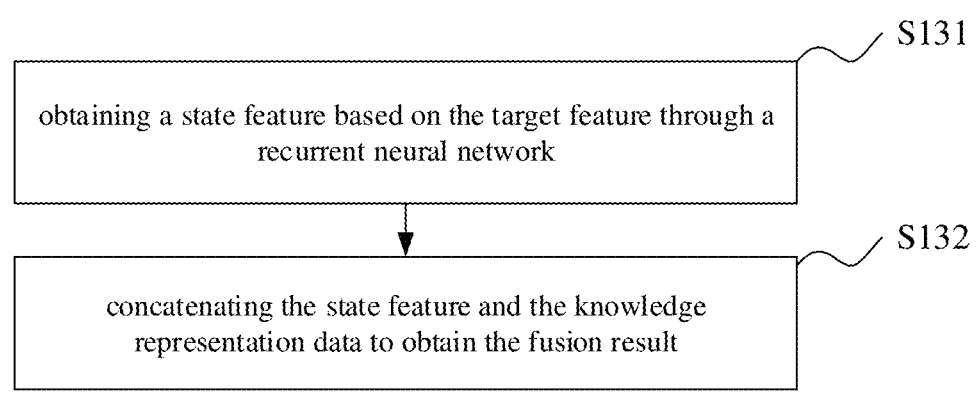
FIG. 2C is a schematic diagram corresponding to step S112 in an image recognition method provided by at least one embodiment of the present disclosure.
Figure 3:
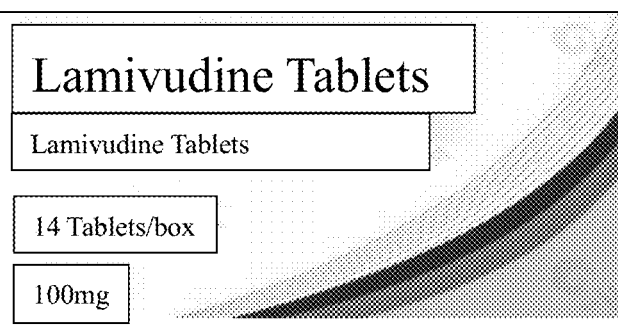
FIG. 3 is an example diagram of an image to be recognized provided by at least one embodiment of the present disclosure.

FIG. 2A is a flowchart of an image recognition method provided by at least one embodiment of the present disclosure, and FIG. 2B is a schematic diagram corresponding to step S102 in an image recognition method provided by at least one embodiment of the present disclosure. FIG. 2C is a schematic diagram corresponding to step S112 in an image recognition method provided by at least one embodiment of the present disclosure, and FIG. 3 is an example diagram of an image to be recognized provided by at least one embodiment of the present disclosure.

For example, in at least one embodiment of the present disclosure, the image recognition method 100 can be applied to scenes such as medicine name recognition, etc. For example, in at least one embodiment of the present disclosure, as illustrated in FIG. 2A, the image recognition method 100 may include the following operations:

S101: acquiring an image to be recognized, in which the image to be recognized comprises a target text;

S102: determining text content of the target text based on knowledge information and image information of the image to be recognized.

It should be noted that, in the embodiments of the present disclosure, steps S101-S102 can be executed sequentially or in other adjusted orders, and some or all of the operations in steps S101-S102 can be executed in parallel. The embodiments of the present disclosure are not limited in the aspect of the execution order of each step, which can be adjusted according to the actual situation. For example, in the examples of the present disclosure, steps S101-S102 may be performed in a separate server (e.g., a cloud server, etc.) or may be performed on a local terminal, which is not limited in the embodiments of the present disclosure. For example, in some examples, upon implementing the image recognition method 100 provided by at least one embodiment of the present disclosure, some steps among steps S101-S102 can be selectively executed, and some additional steps other than steps S101-S102 can also be executed, which is not specifically limited in the embodiments of the present disclosure.

For example, in at least one embodiment of the present disclosure, the image to be recognized may be an image of a medicine to be recognized, for example, a picture of a medicine box illustrated in FIG. 3, an image of a bank card, an image of a certificate (for example, an ID card, a driving license, a visa, etc.), etc. The embodiments of the present disclosure are not limited to this case, which can be set according to actual conditions. For example, the image to be recognized may be an image taken by a sensor such as a camera, etc., an image downloaded from an Internet, or a local image stored in a terminal or a server, which is not limited by the embodiments of the present disclosure.

For example, in the embodiments of the present disclosure, the image to be recognized may be an initial image (such as the picture of the medicine box illustrated in FIG. 3), or may be a text region image obtained by text region detection (such as an image in black rectangular frame illustrated in FIG. 3), which is not limited by the embodiments of the present disclosure. For example, the image to be recognized may be an image containing only a text region (the image in the black rectangular frame illustrated in FIG. 3). For example, in the case where the image to be recognized includes a plurality of text region images, each of the plurality of text region images is sequentially processed by using the image recognition method provided by some embodiments of the present disclosure, and then the text contents of the plurality of target texts are output.

For example, in at least one embodiment of the present disclosure, the image to be recognized may include one or more text region images. For example, the text region image refers to an image of a region where the target text appears in the image to be recognized (for example, a text box covering only a length of the text). Usually, for the text recognition of complex scenes, it is necessary to locate the position of the text first, that is, to detect the text region and obtain the text region image, so as to perform the text recognition operation more efficiently and accurately. For example, in the embodiments of the present disclosure, acquiring the image to be recognized may include acquiring the text region image in the image to be recognized, so as to perform subsequent text recognition operations based on the text region image, which is not limited by the embodiments of the present disclosure. For example, in an example, the image to be recognized itself is a text region image. For example, in another example, the image to be recognized includes a plurality of text region images, and in this case, the text recognition operation can be performed on the plurality of text region images in turn, which is not limited by the embodiments of the present disclosure.

For example, in an embodiment, the text region detection can be performed on the image to be recognized so as to obtain a text region image including the target text. For example, in an example, determining the text content of the target text based on the knowledge information and the image information of the image to be recognized may include determining the text content of the target text based on the knowledge information and the image information of the text region image.

For example, in an example, a connectionist text proposal network (CTPN) can be adopted to realize the text region detection of the image to be recognized. For example, CTPN includes the steps of detecting small-scale text boxes, circularly connecting text boxes, thinning text lines, etc. It should be noted that, the embodiments of the present disclosure do not limit the method of text region detection.

For example, as illustrated in FIG. 3, an image of a region located within the black rectangular frame can be taken as the text region image. For example, a distance between each edge of the text box and the nearest text is within a certain threshold, for example, the threshold is in a range of 2-5 mm. For example, in the case where the text box is a rectangle, the distance between the top and bottom edges of the rectangle and the top and bottom edges of one line of text does not exceed a certain threshold, and the distance between the left and right edges of the rectangle and both edges of one line of text does not exceed a certain threshold. For example, the threshold can be adjusted as needed, that is, the size of the text detection region can be limited and adjusted according to the method used. It should be noted that the shape of the text region image is not limited to the rectangle illustrated in FIG. 3, but may be other shapes such as a step-shape, etc.

For example, in at least one embodiment of the present disclosure, the target text refers to the specific text in the image to be recognized. For example, in an example, in the case where the image to be recognized is the image of the medicine box illustrated in FIG. 3, the target text may include the medicine name "Lamivudine Tablets" in Chinese and "Lamivudine Tablets", specifications "14 Tablets/box", "100 mg", and "the approval registered number of traditional Chinese medicines: H2009XXXX", etc. For example, in another example, in the case where the image to be recognized is an image of an ID card, the target text may be the name, gender, date of birth, address, citizenship number, etc., of the ID card holder. The embodiments of the present disclosure do not limit the specific content of the target text, which can be set according to actual conditions, for example, according to specific application scenarios.

For example, in at least one embodiment of the present disclosure, the knowledge information refers to the knowledge information associated with the target text, which comes from the data knowledge base associated with the target text. For example, in the case where the target text is the medicine name in the image of the medicine box to be recognized, the knowledge information can be the medicine information from the medicine knowledge base. In the case where the image recognition method is applied to other scenes, the knowledge information can be the corresponding type of knowledge information and the data knowledge base can be the corresponding type of data knowledge base. The data knowledge base can be established before executing the image recognition method, and can also be optimized and improved during and after executing the image recognition method.

Therefore, the image recognition method 100 provided by at least one embodiment of the present disclosure not only considers the image information of the image to be recognized, but also considers the associated knowledge information, and combining these two aspects of information for the text recognition can effectively improve the accuracy of the text recognition.

As illustrated in FIG. 2B, for example, in an embodiment of the present disclosure, the above step S102 of determining the text content of the target text based on the knowledge information and the image information of the image to be recognized may include the following steps S110-S113:

S110: performing feature extraction on the image to be recognized to obtain a target feature;

S111: obtaining knowledge representation data based on the knowledge information;

S112: fusing the target feature and the knowledge representation data to obtain a fusion result; and S113: determining the text content of the target text based on the fusion result.

It should be noted that, in the embodiments of the present disclosure, steps S110 to S113 may be executed sequentially or in other adjusted orders, and some or all of the operations in steps S110 to S113 may be executed in parallel. The embodiments of the present disclosure do not limit the execution order of each step, which can be adjusted according to the actual situation. For example, in some examples, implementation of the image recognition method 100 provided by at least one embodiment of the present disclosure may selectively perform some steps from step S110 to step S113, and may also perform some additional steps except step S110 to step S113, which is not specifically limited by the embodiments of the present disclosure.

For example, in the embodiments of the present disclosure, for step S110, a convolution neural network may be used to extract features from the image to be recognized so as to obtain the target feature, which is not limited by the embodiments of the present disclosure.

For example, in the embodiments of the present disclosure, for step S111, the knowledge representation data may be a vector representation of corresponding knowledge information, for example, the knowledge representation data may include one or more pieces of knowledge representation data, which is not limited by the embodiments of the present disclosure. For example, the knowledge representation data may be a vector representation of the medicine information from the medicine knowledge base. For example, in the embodiments of the present disclosure, the structured knowledge information in the data knowledge base can be represented in a vector form by various methods, so as to obtain a plurality of knowledge representation data. For example, in an example, the knowledge representation data includes the vector representation of the medicine name for the subsequent concatenating operation. For example, the medicine knowledge base includes the names of a plurality of medicines, and the names of the plurality of medicines are respectively converted into the knowledge representation data in vector form. For example, in an example, based on the knowledge information in the data knowledge base, the knowledge representation data in vector form can be obtained by using the TransE algorithm, or other algorithms can be adopted, which is not specifically limited by the embodiments of the present disclosure.

For example, in at least one embodiment of the present disclosure, for step S112, the fusion result is based on the fusion or concatenating of the image itself information (e.g., the target feature) of the image to be recognized and the knowledge information (e.g., the plurality of pieces of knowledge representation data) of the data knowledge base. For example, in at least one embodiment of the present disclosure, the fusion result can be embodied by concatenating features, and the fusion result can also be embodied by other forms, which is not specifically limited by the embodiments of the present disclosure.

It should be noted that, in the embodiments of the present disclosure, the target features (for example, output through the convolution neural network) can be directly concatenated with a plurality of pieces of knowledge representation data so as to obtain the fusion result; it is also possible to convert the target feature into a state feature through the recurrent neural network (for example, the state feature includes a hidden state of each moment in the recurrent neural network, etc.), and then concatenate the state feature with the plurality of pieces of knowledge representation data so as to obtain the fusion result, which is not limited by the embodiments of the present disclosure.

For example, in at least one embodiment of the present disclosure, for step S112, as illustrated in FIG. 2C, fusing the target feature and the knowledge representation data to obtain the fusion result may include the following steps S131-S132:

S131: obtaining a state feature based on the target feature through a recurrent neural network; and S132: concatenating the state feature and the knowledge representation data to obtain the fusion result.

For example, in at least one embodiment of the present disclosure, the recurrent neural network can be a unidirectional recurrent neural network, a bi-directional recurrent neural network, a bi-directional long short term memory network recurrent neural network, and the like, and the embodiments of the present disclosure are not limited to this case.

For example, in at least one embodiment of the present disclosure, there are a plurality of pieces of knowledge representation data, and in step S132, concatenating the state feature and the plurality of pieces of knowledge representation data to obtain the fusion result includes:

based on the state feature and the plurality of pieces of knowledge representation data, obtaining a concatenating feature of each moment among a plurality of moments, in which the concatenating feature is the fusion result.

Figure 4:
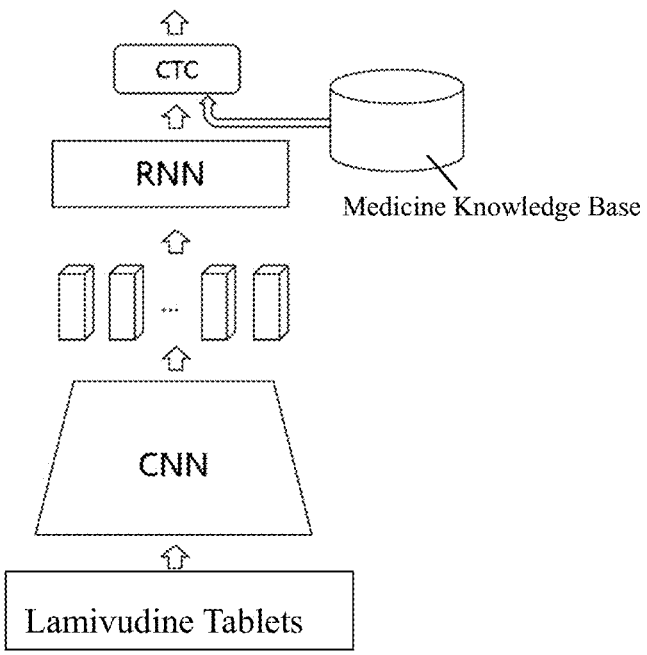
FIG. 4 is a schematic diagram of an image recognition method provided by at least one embodiment of the present disclosure.
Figure 5:
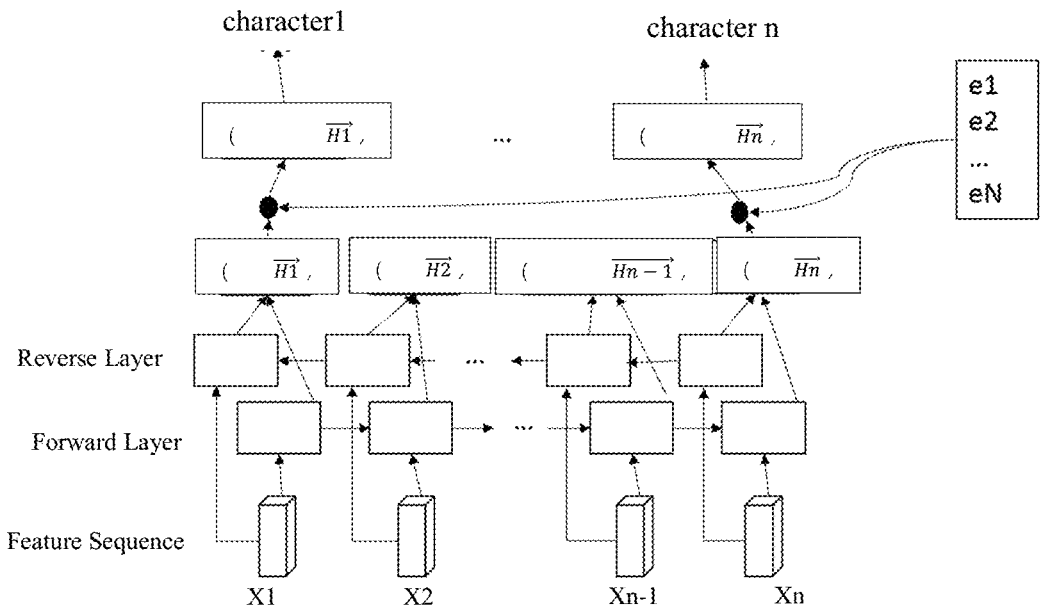
FIG. 5 is a schematic diagram corresponding to step S131 in an image recognition method provided by at least one embodiment of the present disclosure.

FIG. 4 is a schematic diagram of an image recognition method provided by an embodiment of the present disclosure, and FIG. 5 is a schematic diagram of some steps corresponding to FIG. 2B in an image recognition method provided by an embodiment of the present disclosure.

With reference to FIGS. 4 and 5, the image recognition method 100 provided by the embodiments of the present disclosure is described in detail below. For example, in an example, in the case where the image recognition method 100 is applied to the scene of recognizing the medicine names, the knowledge information from the medicine knowledge base can be combined in the text recognition process, as illustrated in FIG. 4.

For example, the image recognition method 100 can be applied to a first neural network, which can include a recurrent neural network (RNN) and a convolution neural network (CNN). For example, the recurrent neural network (RNN) can be a unidirectional recurrent neural network, a bi-directional recurrent neural network, a bi-directional long short term memory network recurrent neural network (BiLSTM RNN), etc. The embodiments of the present disclosure are not limited to this case. It should be noted that the first neural network may also include other structures, and the first neural network may also include fewer structures. For example, the first neural network may only include a convolution neural network CNN, etc., which is not limited by the embodiments of the present disclosure.

For example, in an example, in step S110, any type of convolution neural network (for example, lightweight network ShuffleNet, MobileNet, etc.) can be used to extract the features of the image to be recognized (or the text region image of the image to be recognized) so as to obtain the target features.

It should be noted that the embodiments of the present disclosure do not limit the selection of the convolution neural network, which can be determined according to actual requirements.

For example, step S110 may be performed at the convolution layer of the first neural network. For example, the first neural network may include the convolution recurrent neural network illustrated in FIG. 1. Combined with the previous description of FIG. 1, the convolution neural network (CNN) can extract the features of the image to be recognized so as to obtain the target features, which may not be described in detail here.

Figure 6A:
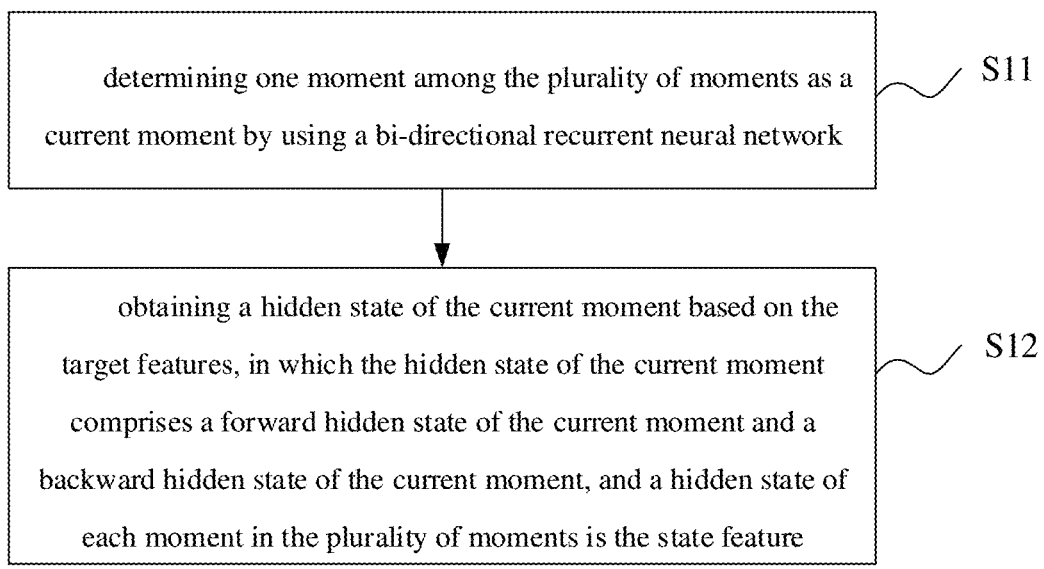
FIG. 6A is a flowchart corresponding to step S131 illustrated in FIG. 2C provided by at least one embodiment of the present disclosure.
Figure 6B:
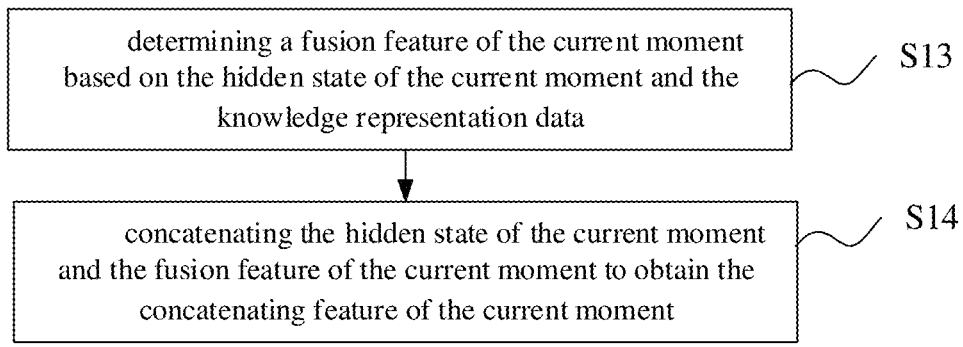
FIG. 6B is a flowchart corresponding to step S132 illustrated in FIG. 2C provided by at least one embodiment of the present disclosure.

FIG. 6A is a flowchart corresponding to step S131 in FIG. 2C according to at least one embodiment of the present disclosure. FIG. 6B is a flowchart corresponding to step S132 in FIG. 2C according to at least one embodiment of the present disclosure.

For example, in at least one embodiment of the present disclosure, as illustrated in FIG. 6A, for step S131, obtaining a state feature based on the target feature through a recurrent neural network includes the following operations:

S11: determining one moment among the plurality of moments as a current moment by using a bi-directional recurrent neural network; and S12: obtaining a hidden state of the current moment based on the target features, in which the hidden state of the current moment comprises a forward hidden state of the current moment and a backward hidden state of the current moment, and the hidden state of each moment among the plurality of moments is the state feature.

For example, in at least one embodiment of the present disclosure, as illustrated in FIG. 6B, for step S132, obtaining the concatenating feature of each moment among the plurality of moments based on the state feature and the plurality of pieces of knowledge representation data includes the following operations:

S13: determining a fusion feature of the current moment based on the hidden state of the current moment and the plurality of pieces of knowledge representation data; and S14: concatenating the hidden state of the current moment and the fusion feature of the current moment to obtain the concatenating feature of the current moment.

For example, in an example, the recurrent layer can adopt any type of recurrent neural network. For example, in an example, the recurrent layer can adopt unidirectional recurrent neural network, bi-directional recurrent neural network, bi-directional long short term memory network recurrent neural network (BiLSTM RNN), etc., which is not limited by the embodiments of the present disclosure. For example, as illustrated in FIG. 5, in an example, the recurrent layer adopts a bidirectional long short term memory network recurrent neural network, which includes a forward layer and a reverse layer, and both the forward layer and the reverse layer include a plurality of memory cells (as illustrated in the blank box in FIG. 5). For example, as illustrated in FIG. 5, the forward layer includes a plurality of memory cells connected by arrows to the right, and the reverse layer includes a plurality of memory cells connected by arrows to the left, and each memory cell corresponds to one moment and one input feature vector (for example, X1, . . . , Xn in the figure), for example, the hidden state of the current moment is related to the hidden state of a previous moment and the hidden state of a next moment, which can be used to memorize the temporal logic of the text. For example, in LSTM, each memory cell includes a cell state, a forgetting gate, an input gate and an output gate. These gate structures can allow memory information to selectively pass through, which is used to remove or add information to the cell state.

For example, in an example, one moment is determined as the current moment, and the current moment is t, and t is an integer greater than 0. Based on the target features (as illustrated in FIG. 5, the feature sequence X1, . . . , Xn), an input Xt corresponding to the current moment t can be obtained. For example, the current moment t receives the input Xt, and generates a hidden state $\overrightarrow{Ht}$ of the current moment t, i.e., the state feature. The hidden state Ht includes a forward hidden state $\overrightarrow{Ht}$ of the current moment t and a backward hidden state $\overleftarrow{Ht}$ of the current moment t. For example, in an example, the hidden state Ht of the current moment t is a concatenation of the forward hidden state $\overrightarrow{Ht}$ and the backward hidden state $\overleftarrow{Ht}$ of the current moment t, that is, Ht=($\overrightarrow{Ht}$, $\overleftarrow{Ht}$). For example, in an example, if the dimension of the forward hidden state $\overrightarrow{Ht}$ of the current moment t is set to 256 and the dimension of the backward hidden state $\overleftarrow{Ht}$ of the current moment t is set to 256, then the dimension of the hidden state Ht of the current moment t is 512.

For example, in an example, as illustrated in FIG. 5, in order to fuse the knowledge information of the data knowledge base, the knowledge information in the data knowledge base is converted into a knowledge representation vector with the same dimension as the forward hidden state and backward hidden state of the current moment, and the knowledge representation vector is the knowledge representation data. For example, the plurality of pieces of knowledge representation data are (e1, e2, . . . , eN) illustrated in FIG. 5. For example, in the case where the dimension of the forward hidden state $\overrightarrow{Ht}$ of the current moment t is set to 256 and the dimension of the backward hidden state $\overleftarrow{Ht}$ of the current moment t is set to 256, the dimension of knowledge representation data is 256. For example, as illustrated in FIG. 5, the solid black circle ● represents the fusion between the image information (i.e., ($\overrightarrow{Ht}$, $\overleftarrow{Ht}$)) of the image to be recognized and the knowledge information (e1, e2, . . . , eN) represented by the knowledge representation data.

For example, as illustrated in FIG. 5, based on the hidden state ($\overrightarrow{Ht}$, $\overleftarrow{Ht}$) of the current moment t and the plurality of pieces of knowledge representation data (e1, e2, . . . , eN), the fusion feature (Et) of the current moment t is determined, and then the hidden state ($\overrightarrow{Ht}$, $\overleftarrow{Ht}$) of the current moment t and the fusion feature (Et) of the current moment t are concatenated to obtain the concatenating feature ($\overrightarrow{Ht}$, $\overleftarrow{Ht}$, Et) of the current moment t.

Figure 6C:
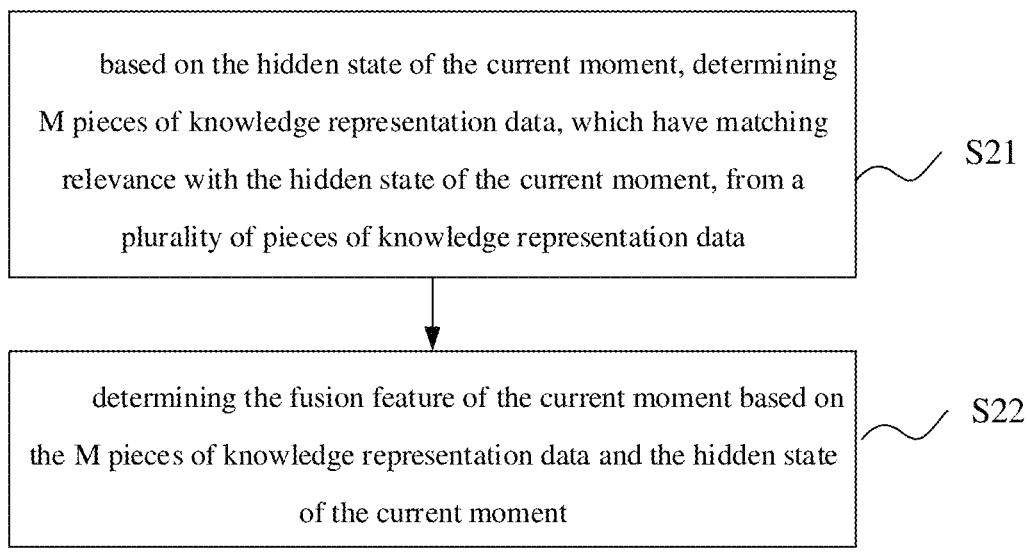
FIG. 6C is a flowchart corresponding to step S13 illustrated in FIG. 6B provided by at least one embodiment of the present disclosure.

FIG. 6C is a flowchart corresponding to step S13 in FIG. 6B according to at least one embodiment of the present disclosure. For example, in at least one embodiment of the present disclosure, for step S13, determining the fusion feature of the current moment based on the hidden state of the current moment and the plurality of pieces of knowledge representation data may include the following operations:

S21: based on the hidden state of the current moment, determining M pieces of knowledge representation data, which have matching relevance with the hidden state of the current moment, from a plurality of pieces of knowledge representation data; and S22: determining the fusion feature of the current moment based on the M pieces of knowledge representation data and the hidden state of the current moment.

For example, M is an integer greater than 0, and M is less than or equal to N, which is the total number of the plurality of pieces of knowledge representation data (e1, e2, . . . , eN). For example, in an example, M=5 and N=50.

Figure 6D:
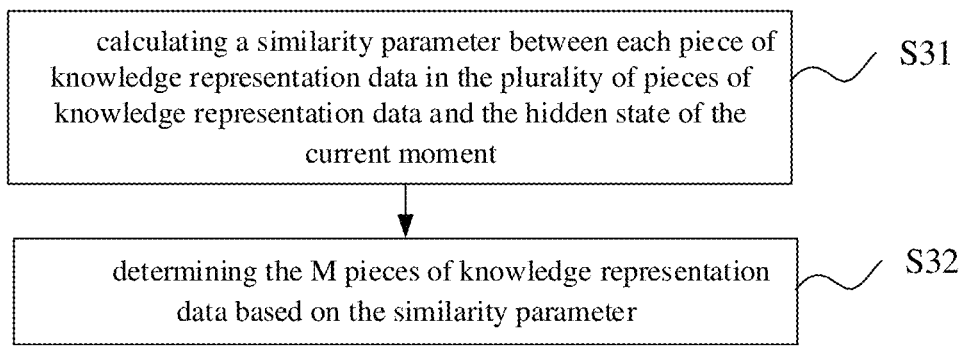
FIG. 6D is a flowchart corresponding to step S21 illustrated in FIG. 6C provided by at least one embodiment of the present disclosure.

FIG. 6D is a flowchart corresponding to step S21 in FIG. 6C according to at least one embodiment of the present disclosure. For example, in at least one embodiment of the present disclosure, as illustrated in FIG. 6D, for step S21, based on the hidden state of the current moment, determining the M pieces of knowledge representation data, which have matching relevance with the hidden state of the current moment, from the plurality of pieces of knowledge representation data, includes the following operations:

S31: calculating a similarity parameter between each piece of knowledge representation data in the plurality of pieces of knowledge representation data and the hidden state of the current moment; and S32: determining the M pieces of knowledge representation data based on the similarity parameter.

For example, in an example, the similarity parameter sim can be calculated by the following expression (1):

$$\text{sim}(j) = (\overrightarrow{Ht}, \overleftarrow{Ht})^T \times W \times ej \qquad (1)$$

where ej represents jth piece of knowledge representation data in the plurality of pieces of knowledge representation data (e1, e2, . . . , eN), t represents the current moment, superscript T represents transposition, $\overrightarrow{Ht}$ represents the forward hidden state of the current moment, $\overleftarrow{Ht}$ represents the backward hidden state of the current moment, W represents a parameter matrix, sim(j) represents a similarity parameter between the jth piece of knowledge representation data in the plurality of pieces of knowledge representation data (e1, e2, . . . , eN) and the hidden state Ht=($\overrightarrow{Ht}$, $\overleftarrow{Ht}$) of the current moment, t is an integer greater than 0, and j is an integer greater than 0.

For example, in an example, the forward hidden state $\overrightarrow{Ht}$ of the current moment t is a matrix of 256*1, the backward hidden state $\overleftarrow{Ht}$ of the current moment t is a matrix of 256*1, and the knowledge representation data ej is a matrix of 256*1, then ($\overrightarrow{Ht}$, $\overleftarrow{Ht}$)$^T$ is a matrix of 1*512, and the parameter matrix W is a matrix of 512*256. The parameter matrix W can be obtained by training based on the training data set.

For example, in an example, the M pieces of knowledge representation data with the largest similarity parameter calculated according to the expression (1) are taken as the M pieces of knowledge representation data (r1, r2, . . . , rM), which have matching relevance with the hidden state Ht of the current moment t.

For example, in another example, the knowledge representation data whose similarity parameter calculated according to the expression (1) is larger than a preset threshold value is taken as the M pieces of knowledge representation data (r1, r2, . . . , rM). For example, the preset threshold refers to the threshold of the similarity parameter. For example, in an example, the preset threshold may range from 2 to 7. For example, in an example, in the case where the preset threshold is 4, if three similarity parameters calculated according to the expression (1) are larger than the preset threshold value 4, then M=3, and if seven similarity parameters calculated according to the expression (1) are larger than the preset threshold value 4, then M=7, which is not specifically limited by the embodiments of the present disclosure.

For example, in at least one embodiment of the present disclosure, because LSTM is adopted, the hidden state of the current moment t gathers the state information of the previous moment, and thus the matching relevance of the knowledge representation data with large similarity to the hidden state of the previous moment is also large. For example, in an example, it is assumed that the medicine name is five characters "Two-A-Double-Lone Tablets" ("Two-A-Double-Lone Tablets" is the Chinese name of the diformin tablets). It should be noted that in this example, it is assumed that in an ideal state, the first character is output at the first moment, the second character is output at the second moment, the third character is output at the third moment, and the fourth character is output at the fourth moment. However, in the embodiments of the present disclosure, the moments and the output characters are not necessarily in one-to-one correspondence. The same one character may be output at multiple moments (for example, the first character "Two" may be output at multiple moments), or there may be no character at some moments, which is not limited by the embodiments of the present disclosure. For example, if the recognized character at the current moment is "A" (for example, the second moment is the current moment), and the hidden state information of the current moment contains the hidden state information of the previous moment, that is, the information includes the two characters "Two-A", then the similarity with the knowledge representation data "Two-A-Double-Lone Tablets" from the medicine knowledge base may generally be greater than the knowledge representation data "Prednisone Tablets", for example, also greater than the knowledge representation data "Mountain tables". Then at the next moment, if the third word is recognized at the next moment, the probability of character "Double" is higher than other words. For example, in an example, through the expression (1), it can be calculated that the similarity parameter between the knowledge representation data "Two-A-Double-Lone Tablets" and the hidden state of the current moment is 9.88; the similarity parameter between the knowledge representation data "Mountain Tablets" and the current hidden state of the current moment is 6.15; and the similarity parameter between the knowledge representation data "Prednisone Tablets" and the current hidden state of the current moment is 2.15. According to the similarity parameters between the plurality of pieces of knowledge representation data from the medicine knowledge base and the hidden state of the current moment, the similarity of "Two-A-Double-Lone Tablets" is the largest, which means that the recognized medicine is more likely to be "Two-A-Double-Lone Tablets", so the third word is more likely to be "Double". For example, because the prefixes of several medicine names may be the same in the medicine knowledge base, for example, the first four words of "Two-A-Double-Lone Tablets" and "Two-A-Double-Lone-Enteric-Coated Tablets" are the same, it may be difficult to determine which one it is in the first four states. Therefore, in the embodiments of the present disclosure, in the case where the M pieces of knowledge representation data (r1, r2, . . . , rM) having matching relevance with the hidden state Ht of the current moment t are determined from the plurality of pieces of knowledge representation data (e1, e2, . . . , En), M can be selected as an integer greater than 4, for example, M=5, M=10, etc., so that similar medicine names (for example, medicine names with large similarity parameters) can be selected as much as possible for subsequent calculation of fusion features. In the embodiments of the present disclosure, the value of M can be determined according to the actual situation.

It should be noted that, in the embodiments of the present disclosure, the above-mentioned matching relevance can mean that there is a certain degree of similarity or other preset conditions between two feature vectors, which can be set according to actual needs, and the embodiments of the present disclosure are not limited to this case.

For example, in at least one embodiment of the present disclosure, the fusion feature of the current moment is determined based on the determined M pieces of knowledge representation data and the hidden state of the current moment.

For example, in an example, the fusion feature Et of the current moment t is determined by the following expression (2):

$$Et = \frac{\sum_{j=1}^{M} e^{sim(j)} \times ej}{\sum_{k=1}^{M} e^{sim(k)}} \qquad (2)$$

where t represents the current moment, Et represents the fusion feature of the current moment, ej represents jth piece of knowledge representation data in the M pieces of knowledge representation data, sim(j) represents a similarity parameter between the jth piece of knowledge representation data in the M pieces of knowledge representation data and the hidden state of the current moment, and sim(k) represents a similarity parameter between kth piece of knowledge representation data in the M pieces of knowledge representation data and the hidden state of the current moment, and t, j, k are integers greater than 0.

For example, in an example, the hidden state Ht=($\overrightarrow{Ht}$, $\overleftarrow{Ht}$) of the current moment t and the fusion feature (Et) of the current moment t calculated by the above expression (2) are concatenated to obtain the concatenating feature ($\overrightarrow{Ht}$, $\overleftarrow{Ht}$, Et) of the current moment. For example, in an example, the concat function can be used to perform the concatenating operation between the hidden state of the current moment and the fusion feature of the current moment, and other concatenating methods can also be used, which is not limited by the embodiments of the present disclosure. For example, the concatenating feature is a fusion result, that is, the concatenating feature contains not only information (e.g., embodied in the hidden state Ht) from target features (i.e., feature sequences extracted based on the input image), but also information (e.g., embodied in the fusion feature Et) from the knowledge representation data (i.e., based on the data knowledge base associated with target text).

For example, in an example, the concatenating features ($\vec{Ht}$, $\overleftarrow{Ht}$, Et) of each moment in the plurality of moments are obtained based on the above method. For example, the prediction result, for example, the composition character sequence (character 1, . . . , character n), etc., as illustrated in FIG. 5, corresponding to each moment can be obtained through the full connection layer and the Softmax layer (e.g., classification network) included in the first neural network.

For example, in an example, based on the prediction result (as illustrated in FIG. 5, character 1, . . . , character n), the text content of the target text is determined. For example, in an example, the prediction result output by the recurrent layer in the first neural network, such as the above tag sequence, is input to the transcription layer in the first neural network. For example, the transcription layer adopts CTC algorithm, and finally the transcription layer outputs the recognized text content, such as the word "Lamivudine Tablets", as illustrated in FIG. 4.

For example, at least one embodiment of the present disclosure also provides a training method for a first neural network, which includes a recurrent neural network and a convolution neural network. The first neural network can be used to: acquire an image to be recognized, in which the image to be recognized comprises a target text; and determine text content of the target text based on knowledge information and image information of the image to be recognized. For example, in an example, the above training method includes inputting training data into the first neural network to obtain output data output from the first neural network. For example, in an example, the training data includes sample images, and the output data includes sample text content. For example, the above training method also includes: by using the back propagation algorithm, based on a loss function, modifying parameters of the recurrent neural network and parameters of the convolution neural network.

For example, in an example, the convolution neural network, the bi-directional recurrent neural network and the aforementioned parameter matrix W in the first neural network as illustrated in FIG. 4 all need to be obtained by learning from the training data. For example, in an example, assuming that xi is a sample image and yi is the corresponding sample text content, for example, in the case where xi is the input image illustrated in FIG. 4, the corresponding yi is "Lamivudine Tablets". Then the training data set D is {(xi, yi), i=1, . . . , Q}, where Q is the amount of the training data. For example, in an example, the above parameters can be adjusted and optimized by back propagation through loss function. For example, in an example, the formula of the loss function is:

Loss=$-\Sigma_{(xi,yi)\in D}P(yi|xi)$, where P is a conditional probability, and the objective of the loss function is to minimize the true conditional probability.

It should be noted that, in the embodiments of the present disclosure, the loss function can adopt any type of function, which is not limited to the above-mentioned loss function, but can be determined according to actual requirements, and the embodiments of the present disclosure are not limited to this case.

For example, in the embodiments of the present disclosure, the image to be recognized can be acquired in various ways, such as shooting by a sensor such as a camera, downloading from a network such as the Internet, reading from the local memory of a terminal or a server, etc. The embodiments of the present disclosure are not limited to this case.

For example, in at least one embodiment of the present disclosure, a connectionist text proposal network (CTPN) may be adopted to realize text region detection of the image to be recognized. CTPN is a full convolution network, which takes images of any size as input and can directly locate text lines in convolution layer. It should be noted that in the embodiments of the present disclosure, other text detection methods (for example, regions with CNN (R-CNN), Fast R-CNN, RPN, etc.) can also be adopted to realize the text region detection of the image to be recognized, so as to obtain the text region image including the target text. The embodiments of the present disclosure do not limit the text detection methods, as long as the text detection function can be realized and the target text can be obtained.

For example, in at least one embodiment of the present disclosure, the image recognition method 100 may further include outputting the text content of the target text. For example, the text content can be displayed on the screen for users to view, or the text content can be transmitted to another unit or module to realize further processing based on the text content. The output manner of the text content can be any manner, which is not limited by the embodiments of the present disclosure.

Figure 7:
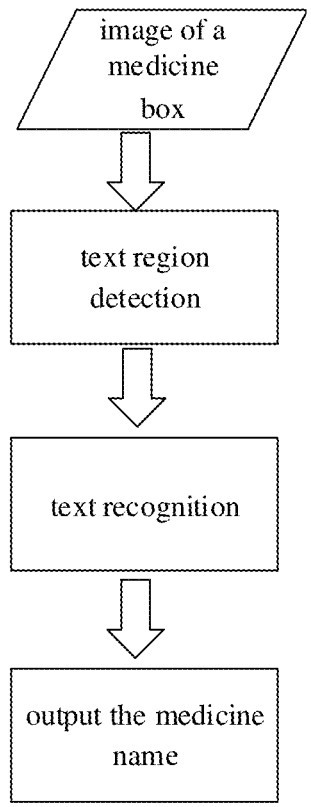
FIG. 7 is a schematic diagram of an example of an image recognition method for medicine name recognition provided by at least one embodiment of the present disclosure.

FIG. 7 is a schematic diagram of an example of an image recognition method for medicine name recognition provided by at least one embodiment of the present disclosure. For example, in combination with the above specific description about the image recognition method 100, in the case of detecting a text region for an image to be recognized, the image recognition method for medicine name recognition as illustrated in FIG. 7 includes: receiving an image of a medicine box to be recognized; performing text region detection on the image of the medicine box to obtain a text region image including a target text; and performing text recognition on the text region image to determine the text content of the target text. The specific text recognition process can be referred to the aforementioned contents, and is not described in detail here. Finally, the medicine name is output.

At least one embodiment of the present disclosure also provides an image recognition apparatus, upon executing text recognition base on the image, the image recognition apparatus not only considers the image information of the image to be recognized, but also considers the associated knowledge information, which can effectively improve the accuracy of text recognition.

Figure 8:
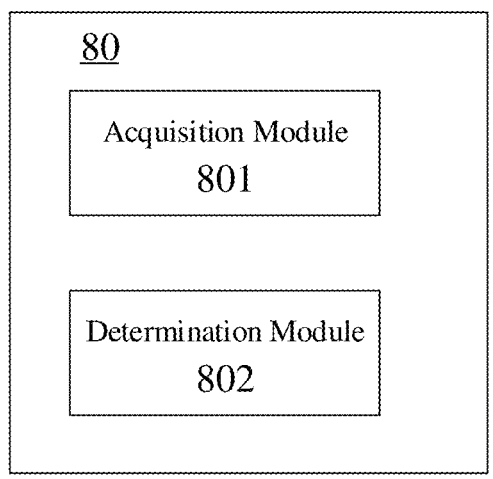
FIG. 8 is a schematic block diagram of an image recognition apparatus provided by at least one embodiment of the present disclosure.

FIG. 8 is a schematic block diagram of an image recognition apparatus provided by at least one embodiment of the present disclosure. As illustrated in FIG. 8, an image recognition apparatus 80 includes an acquisition module 801 and a determination module 802.

For example, in an example, the acquisition module 801 is configured to acquire an image to be recognized, and the image to be recognized includes a target text. For example, the acquisition module 801 can implement step S101, and the specific implementation method can be referred to the related description of step S101, and is not described in detail here.

For example, in an example, the determination module 802 is configured to determine the text content of the target text based on the knowledge information and the image information of the image to be recognized. For example, the determining module 802 can implement step S102, and the specific implementation method can be referred to the related description of step S102, and is not repeated here.

It should be noted that the acquisition module 801 and the determination module 802 can be implemented by software, hardware, firmware or any combination thereof, or both can be implemented as combination of a processor and a memory, for example, they can be implemented as an acquisition circuit 801 and a determination circuit 802 respectively, and the embodiments of the present disclosure do not limit their specific implementation.

It should be understood that the image recognition apparatus 80 provided by the embodiments of the present disclosure can implement the aforementioned image recognition method 100, and can also achieve technical effects similar to those of the aforementioned image recognition method 100, which may not be described in detail here.

It should be noted that in the embodiments of the present disclosure, the image recognition apparatus 80 may include more or less software, hardware and firmware, and the connection relationship among the various software, hardware and firmware is not limited, but may be determined according to actual needs. There are no restrictions on the specific constitution of each software, hardware and firmware, and they can be composed of digital chips, combination of processors and memories, or other suitable forms.

Figure 9:
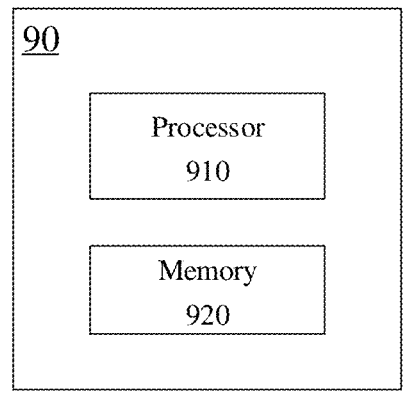
FIG. 9 is a schematic block diagram of an electronic device provided by at least one embodiment of the present disclosure.

FIG. 9 is a schematic block diagram of an electronic device provided by at least one embodiment of the present disclosure. As illustrated in FIG. 9, an electronic device 90 includes a processor 910 and a memory 920. The memory 920 is used to store non-transitory computer readable instructions (e.g., one or more computer program modules). The processor 910 is used to execute the non-transitory computer readable instructions, and in the case where the non-transitory computer readable instructions are executed by the processor 910, one or more steps of the image recognition method described above can be executed. The memory 920 and the processor 910 may be interconnected by a bus system and/or other forms of connection mechanism (not illustrated).

For example, the processor 910 may be a central processing unit (CPU), a digital signal processor (DSP), or other processing units with data processing capability and/or program execution capability, such as a field programmable gate array (FPGA); for example, the central processing unit (CPU) can be X86 or ARM architecture. The processor 910 may be a general purpose processor or a special purpose processor, and may control other components in the electronic device 90 to perform desired functions.

For example, the memory 920 may include any combination of one or more computer program products, which may include various forms of computer-readable storage media, such as volatile memory and/or nonvolatile memory. The volatile memory may include random access memory (RAM) and/or cache, for example. The nonvolatile memory may include, for example, read-only memory (ROM), hard disk, erasable programmable read-only memory (EPROM), portable compact disk read-only memory (CD-ROM), USB memory, flash memory, and the like. One or more computer program modules may be stored on the computer-readable storage medium, and the processor 910 may run the one or more computer program modules to realize various functions of the electronic device 90. The computer-readable storage medium can also store various applications and various data as well as various data used and/or generated by the applications.

It should be noted that, in the embodiments of the present disclosure, the specific functions and technical effects of the electronic device 90 can be referred to the description of the image recognition method 100 above, and will not be described in detail here.

Figure 10:
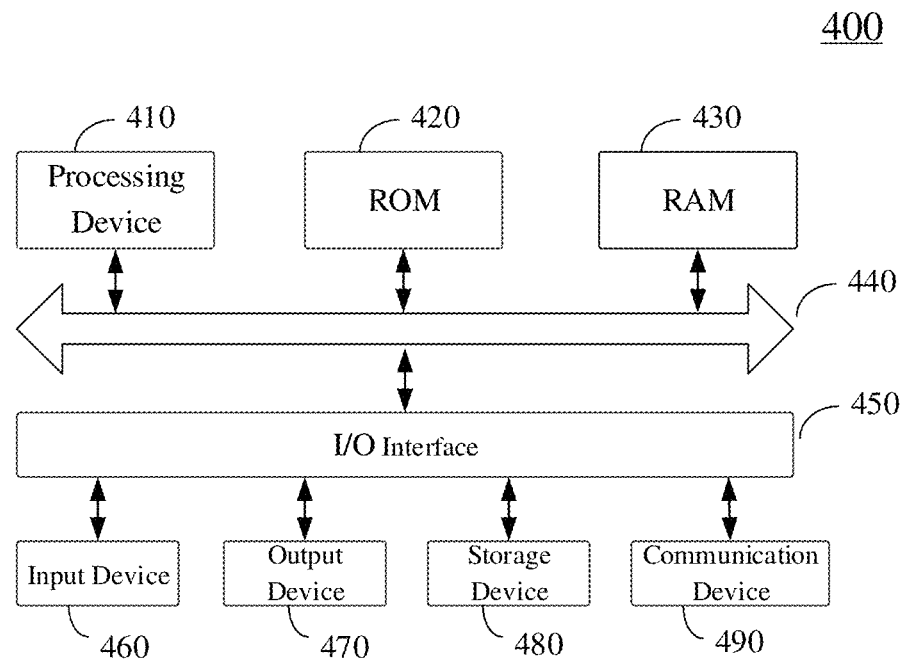
FIG. 10 is a schematic block diagram of another image recognition apparatus provided by at least one embodiment of the present disclosure.

FIG. 10 is a schematic block diagram of another image recognition apparatus provided by at least one embodiment of the present disclosure. An image recognition apparatus 400 is, for example, suitable for implementing the image recognition method provided by the embodiments of the present disclosure. The image recognition apparatus 400 may be a user terminal or the like. It should be noted that the image recognition apparatus 400 illustrated in FIG. 10 is only an example, and it will not bring any restrictions on the functions and application scope of the embodiments of the present disclosure.

As illustrated in FIG. 10, the image recognition apparatus 400 may include a processing device (e.g., a central processing unit, a graphics processor, etc.) 410, which may perform various appropriate actions and processes according to a program stored in a read only memory (ROM) 420 or a program loaded from a storage device 480 into a random access memory (RAM) 430. In the RAM 430, various programs and data necessary for the operation of the image recognition apparatus 400 are also stored. The processing device 410, the ROM 420, and the RAM 430 are connected to each other through a bus 440. An input/output (I/O) interface 450 is also connected to the bus 440.

Generally, the following devices can be connected to the I/O interface 450: an input device 460 including, for example, a touch screen, a touch pad, a keyboard, a mouse, a camera, a microphone, an accelerometer, a gyroscope, and the like; an output device 470 including, for example, a liquid crystal display (LCD), a speaker, a vibrator, and the like; a storage device 480 including, for example, a magnetic tape, a hard disk, etc.; and a communication device 490. The communication device 490 may allow the image recognition apparatus 400 to perform wireless or wired communication with other electronic devices to exchange data. Although FIG. 10 shows the image recognition apparatus 400 having various devices, it should be understood that it is not required to implement or have all the illustrated devices, and the image recognition apparatus 400 may alternatively implement or have more or fewer devices.

For example, the image recognition method provided by the embodiments of the present disclosure can be implemented as a computer software program. For example, the embodiments of the present disclosure include a computer program product including a computer program carried on a non-transitory computer readable medium, and the computer program includes program codes for executing the above-described image recognition method 100. In such an embodiment, the computer program can be downloaded and installed from the network through the communication device 490, or installed from the storage device 480, or from the ROM 420. In the case where the computer program is executed by the processing device 410, the image recognition method 100 provided by the embodiments of the present disclosure can be executed.

At least one embodiment of the present disclosure also provides a non-transitory readable storage medium for storing non-transitory computer readable instructions, and in the case where the non-transitory computer readable instructions are executed by a computer, the image recognition method described in any embodiment of the present disclosure can be realized. With this storage medium, the image information of the image to be recognized and the associated knowledge information can be comprehensively considered in the case where the text recognition based on the image is performed, and the accuracy of text recognition can be effectively improved.

Figure 11:
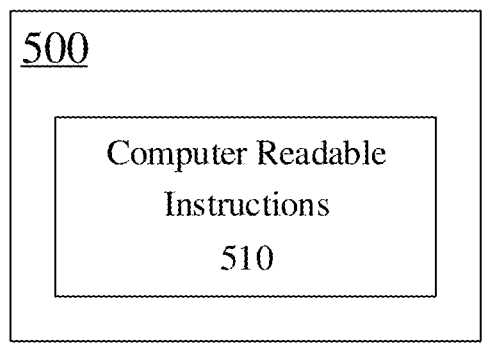
FIG. 11 is a schematic diagram of a non-transitory readable storage medium provided by at least one embodiment of the present disclosure.

FIG. 11 is a schematic diagram of a non-transitory readable storage medium provided by at least one embodiment of the present disclosure. As illustrated in FIG. 11, a storage medium 500 is used to store non-transitory computer readable instructions 510. For example, in the case where the non-transitory computer-readable instructions 510 are executed by a computer, one or more steps in the image recognition method 100 according to the above embodiments can be performed.

For example, the storage medium 500 can be applied to the above-mentioned image recognition apparatuses 90 and 400. For example, the storage medium 500 may be the memory 920 in the electronic device 90 illustrated in FIG. 9. For example, the description of the storage medium 500 can be referred to the corresponding description of the memory 920 in the electronic device 90 illustrated in FIG. 9, and is not repeated here.

The following statements should be noted.

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, and are not intended to limit the protection scope of the present disclosure, and the protection scope of the present disclosure should be based on the protection scope of the appended claims.

What is claimed is:

1. An image recognition method, comprising:
acquiring an image to be recognized, wherein the image to be recognized comprises a target text; and
determining text content of the target text based on knowledge information and image information of the image to be recognized.

2. The image recognition method according to claim 1, wherein determining the text content of the target text based on the knowledge information and the image information of the image to be recognized comprises:
performing feature extraction on the image to be recognized so as to obtain a target feature;
obtaining knowledge representation data based on the knowledge information;
fusing the target feature and the knowledge representation data to obtain a fusion result; and
determining the text content of the target text based on the fusion result.

3. The image recognition method according to claim 2, wherein fusing the target feature and the knowledge representation data to obtain the fusion result comprises:
obtaining a state feature based on the target feature through a recurrent neural network; and
concatenating the state feature and the knowledge representation data to obtain the fusion result.

4. The image recognition method according to claim 3, wherein concatenating the state feature and the knowledge representation data to obtain the fusion result comprises:
based on the state feature and the knowledge representation data, obtaining a concatenating feature of each moment in a plurality of moments, wherein the concatenating feature is the fusion result.

5. The image recognition method according to claim 4, wherein determining the text content of the target text based on the fusion result comprises:
outputting a prediction result corresponding to each moment in the plurality of moments based on the concatenating feature; and
determining the text content of the target text based on the prediction result.

6. The image recognition method according to claim 3, wherein obtaining the state feature based on the target feature through the recurrent neural network comprises:
determining one moment among the plurality of moments as a current moment by using a bi-directional recurrent neural network; and
obtaining a hidden state of the current moment based on the target feature, wherein the hidden state of the current moment comprises a forward hidden state of the current moment and a backward hidden state of the current moment, and
a hidden state of each moment in the plurality of moments is the state feature.

7. The image recognition method according to claim 6, wherein obtaining the concatenating feature of each moment in the plurality of moments based on the state feature and the knowledge representation data comprises:
determining a fusion feature of the current moment based on the hidden state of the current moment and the knowledge representation data; and
concatenating the hidden state of the current moment and the fusion feature of the current moment to obtain the concatenating feature of the current moment.

8. The image recognition method according to claim 7, wherein determining the fusion feature of the current moment based on the hidden state of the current moment and the knowledge representation data comprises:
based on the hidden state of the current moment, determining M pieces of knowledge representation data, which have matching relevance with the hidden state of the current moment, from a plurality of pieces of knowledge representation data comprised in the knowledge representation data; and
determining the fusion feature of the current moment based on the M pieces of knowledge representation data and the hidden state of the current moment,
wherein M is an integer greater than 0.

9. The image recognition method according to claim 8, wherein based on the hidden state of the current moment, determining the M pieces of knowledge representation data, which have matching relevance with the hidden state of the current moment, from the plurality of pieces of knowledge representation data, comprises:
calculating a similarity parameter between each piece of knowledge representation data in the plurality of pieces of knowledge representation data and the hidden state of the current moment; and
determining the M pieces of knowledge representation data based on the similarity parameter.

10. The image recognition method according to claim 9, wherein an expression of the similarity parameter is as follows:

$$sim(j) = (\overrightarrow{Ht}, \overleftarrow{Ht})^T \times W \times e_j,$$

where $e_j$ represents jth piece of knowledge representation data in the plurality of pieces of knowledge representation data, t represents the current moment, superscript T represents transposition, $\overrightarrow{Ht}$ represents the forward hidden state of the current moment, $\overleftarrow{Ht}$ represents the backward hidden state of the current moment, W represents a parameter matrix, sim(j) represents a similarity parameter between the jth piece of knowledge representation data and the hidden state of the current moment, t is an integer greater than 0, and j is an integer greater than 0.

11. The image recognition method according to claim 9, wherein determining the M pieces of knowledge representation data based on the similarity parameter comprises:
taking the M pieces of knowledge representation data with largest similarity parameters as the M pieces of knowledge representation data having matching relevance with the hidden state of the current moment, or
taking knowledge representation data with similarity parameters greater than a preset threshold as the M pieces of knowledge representation data having matching relevance with the hidden state of the current moment.

12. The image recognition method according to claim 9, wherein an expression of the fusion feature of the current moment is as follows:

$$Et = \frac{\sum_{j=1}^{M} e^{sim(j)} \times ej}{\sum_{k=1}^{M} e^{sim(k)}},$$

where t represents the current moment, Et represents the fusion feature of the current moment, ej represents jth piece of knowledge representation data in the M pieces of knowledge representation data, sim(j) represents a similarity parameter between the jth piece of knowledge representation data in the M pieces of knowledge representation data and the hidden state of the current moment, and sim(k) represents a similarity parameter between kth piece of knowledge representation data in the M pieces of knowledge representation data and the hidden state of the current moment, and t, j, k are integers greater than 0.

13. The image recognition method according to claim 2, wherein performing the feature extraction on the image to be recognized so as to obtain the target feature comprises:
performing the feature extraction on the image to be recognized so as to obtain the target feature by using a convolution neural network.

14. The image recognition method according to claim 1, further comprising:
performing text region detection on the image to be recognized so as to obtain a text region image comprising the target text.

15. The image recognition method according to claim 14, wherein determining the text content of the target text based on the knowledge information and the image information of the image to be recognized comprises:
determining the text content of the target text based on the knowledge information and image information of the text region image.

16. The image recognition method according to claim 1, further comprising:
outputting the text content of the target text.

17. An electronic device, comprising:
a processor; and
a memory, comprising one or more computer program modules,
wherein the one or more computer program modules are stored in the memory and configured to be executed by the processor, and the one or more computer program modules is configured to realize the image recognition method according to claim 1.

18. A non-transitory readable storage medium, for storing computer readable instructions, wherein in a case where the computer readable instructions are executed by a computer, the image recognition method according to claim 1 is realized.

19. A training method of a first neural network for image recognition, wherein the first neural network comprises a recurrent neural network and a convolution neural network, the first neural network is configured to:
acquire an image to be recognized, wherein the image to be recognized comprises a target text; and
determine text content of the target text based on knowledge information and image information of the image to be recognized; and
the training method comprises:
inputting training data into the first neural network to obtain output data output from the first neural network; and
by using a back propagation algorithm, based on a loss function, modifying parameters of the recurrent neural network and parameters of the convolution neural network.

20. An image recognition apparatus, comprising:
an acquisition module, configured to acquire an image to be recognized, wherein the image to be recognized comprises a target text; and
a determination module, configured to determine text content of the target text based on knowledge information and image information of the image to be recognized.

* * * * *